United States Patent
Constantine et al.

(10) Patent No.: US 7,992,486 B2
(45) Date of Patent: Aug. 9, 2011

(54) CALIBRATED HANDHELD ESPRESSO TAMPER

(75) Inventors: Bruce Constantine, Mansfield, MA (US); Christopher McLean, Vancouver (CA)

(73) Assignee: Espro Inc., Vancouver, BC (CA)

( * ) Notice: Subject to any disclaimer, the term of this patent is extended or adjusted under 35 U.S.C. 154(b) by 1451 days.

(21) Appl. No.: 11/016,638

(22) Filed: Dec. 17, 2004

(65) Prior Publication Data

US 2005/0132890 A1 Jun. 23, 2005

Related U.S. Application Data

(60) Provisional application No. 60/530,507, filed on Dec. 18, 2003.

(51) Int. Cl.
*A23L 1/00* (2006.01)
(52) U.S. Cl. ............ 99/275; 99/580; 99/297; 99/279; 99/295; 99/285; 99/286
(58) Field of Classification Search .......... 426/512, 426/432, 433, 435; 99/275, 280, 297, 279, 99/295, 285, 286
See application file for complete search history.

(56) References Cited

U.S. PATENT DOCUMENTS

| | | | |
|---|---|---|---|
| 2,299,918 A * | 10/1942 | Moellenkamp | 404/133.1 |
| 4,602,558 A | 7/1986 | Kaper et al. | |
| 4,645,132 A | 2/1987 | Fregnan | |
| 4,804,550 A | 2/1989 | Bardsley et al. | |
| 4,852,474 A | 8/1989 | Manlich et al. | |
| 4,945,824 A | 8/1990 | Borgmann | |
| 5,106,239 A * | 4/1992 | Krebsbach | 406/63 |
| 5,174,194 A | 12/1992 | Piana | |
| D348,590 S | 7/1994 | Scott | |
| 5,526,733 A * | 6/1996 | Klawuhn et al. | 99/287 |
| D375,233 S | 11/1996 | Hirsch | |
| 5,622,099 A | 4/1997 | Frei | |
| 5,636,563 A * | 6/1997 | Oppermann et al. | 99/285 |
| 5,638,740 A | 6/1997 | Cai | |
| 5,911,810 A * | 6/1999 | Kawabata | 99/302 P |
| 6,095,032 A | 8/2000 | Banett et al. | |
| 6,220,147 B1 | 4/2001 | Priley | |
| 6,382,083 B2 | 5/2002 | Schmed | |
| 6,412,394 B2 | 7/2002 | Bonanno | |
| D468,597 S | 1/2003 | Kerr | |
| 6,978,682 B2 * | 12/2005 | Foster et al. | 73/818 |
| 2004/0206243 A1 | 10/2004 | Foster et al. | |

OTHER PUBLICATIONS

La Marzocco International, "Swift EPS_B Operating Manual V1.0" copyright 2002, pp. 1-31 (incl. pp. 8-12, 19, 25, 20-30), La Marzocco, International, USA.

(Continued)

*Primary Examiner* — Anthony Weier
(74) *Attorney, Agent, or Firm* — Laurence C. Bonar

(57) ABSTRACT

An espresso tamper including a force calibration means is shown. The tamper is optimally handheld. Upon force of a desired magnitude being applied by a user, at least one discrete signal, such as an audible, visual, tactile or electrical signal is emitted. The tamper handle includes an anti-rotation feature. The handle is flared to avoid pinching the user's fingers during operation and to stop the user's fingers from sliding down the handle or in any way touching the base, thereby rendering the tamper more effective and safe. The tamper and force-calibration kit and method of use optimize espresso making.

21 Claims, 6 Drawing Sheets

OTHER PUBLICATIONS

Macap, <http://www.macap.it/english/prodotto.asp?cat=1&subcat=4>, accessed Mar. 15, 2005, posted as early as 2002, p. 1.

1st-Line Equipment, <http://www.1st-line.net/cgi-bin/category.cgi?item=CPS&type=store>, accessed Mar. 15, 2005, posted as early as 2002, pp. 1-2.

Coffeegeek, <http://www.coffeegeek.com/reviews/accessories/autotamper/tenacioustommy>, posted Oct. 24, 2002, pp. 1-5.

Schomer, D.C., <http://www.lucidcafe.com/cafeforum/schomertable11.html>, revised Oct. 24, 1997, copyright 1996-97, pp. 1-2.

Crankshaw, J., http://home.att.net/~jcrankshaw/tamper.htm>, accessed Sep. 16, 2003, copyright 1999-2002, pp. 1-3.

Coffee Research Institute, "Tamping", <http://www.coffeeresearch.org/espresso/tamping.htm>, accessed Nov. 26, 2004, posted 2001 or earlier, pp. 1-3.

* cited by examiner

Section A-A

CALIBRATED HANDHELD ESPRESSO TAMPER

FIELD OF THE INVENTION

The present invention is related to the field of espresso tampers, and is more particularly related to the field of handheld espresso tampers incorporating calibration means.

BACKGROUND TO THE INVENTION

The preparation of espresso coffee involves the expression of heated water under pressure through a compressed portion of coffee grounds in order to deliver the desired serving of concentrated espresso coffee. It is known that in order to prepare a desirably high quality espresso coffee end product, the process by which the espresso is made must be carefully controlled. The variables involved in the production of espresso coffee that are known to have a significant effect on the quality of the espresso and which may be desirably controlled to result in a preferred high quality espresso coffee product include the volume of the espresso shot, the water temperature and pressure, the coffee grind dimensions, uniformity of grind dimensions, and quantity of coffee grounds used, and the degree of compression and surface characteristics of the coffee grounds through which the hot, high-pressure water is forced. As each of these variables affect the quality of the espresso coffee produced, it is desirable to be able to simply control each during the espresso-making process. Using commercially available espresso-making equipment, the only variables that are not simply controlled so as to be repeatable in the espresso-making process are the compression and surface characteristics of the coffee grounds prior to the introduction of hot water.

The compression of the coffee grounds in the basket of the portafilter is known as tamping, and may be performed using a variety of devices known in the art, which are generally referred to as espresso tampers. Types of espresso tampers known in the art include handheld manual tampers, fixed tamping surfaces typically mounted on coffee grinding machines, and large tamping machines which typically exert tamping force by means of a lever actuated or mechanized plunger.

Handheld manual tampers are generally solid ornamental objects configured with a lower surface adapted to allow the application of pressure on the coffee grounds in the filter basket, and an upper or outer surface suitable for holding in the hand of the user. Following compression of the grounds, the handheld tamper is typically spun on the surface of the compressed grounds, in order to form a smooth polished surface through which the heated water will be expressed in order to deliver the espresso coffee. Tamping surfaces typically attached to some types of coffee grinding machines are also known in the art. The portafilter is typically held against the underside of the fixed tamping surface such that the coffee grounds may be compressed by the application of upward force exerted manually by the user. The ability of such manually operated-tampers known in the art to deliver a precise predetermined degree of compression of the grounds is limited, as the magnitude of the tamping force applied is determined solely by the tactile judgment of the user. It is therefore very difficult for even a skilled user to obtain precise and repeatable application of any predetermined optimum tamping force using a manual tamper of the types known in the art.

Tamping machines operate by the mechanical application of tamping force to compress the coffee grounds, wherein the tamping force may be generated using a hand lever operated, or otherwise mechanically powered plunger which compresses the grounds in a portafilter basket. Tamping machines of the types known in the art may be controlled to deliver a relatively precise tamping force through the use of complex force measurement mechanisms. However, tamping machines are limited in their use due to their large size and expense, and the fact that they must generally be permanently mounted in a single location, which can be inconvenient for the user. Further, tamping machines known in the art do not allow for the desirable polishing of the surface of the compressed coffee grounds by spinning of the tamper surface, or for desirable tactile feedback to the user regarding the uniformity or lack thereof of the tamping process.

It is an object of the present invention to provide a handheld espresso tamper to overcome some of the limitations of the espresso tampers of the prior art. A further object of the handheld espresso tamper according to the present invention is to enable accurate repeatability of the tamping compressive force applied through the inventive handheld tamper. Additional advantages of several embodiments of the handheld espresso tamper according to the present invention include the ease with which the repeatable tamping force may be applied by a user, the variability of the tamping force applied for use with different espresso applications or equipment, and the safety, comfort, effectiveness and efficiency of use of the handheld espresso tamper by the user.

SUMMARY OF THE INVENTION

According to an embodiment of the present invention, a handheld espresso tamper is provided for the application of a tamping force by a user, the handheld espresso tamper comprising a tamping force calibration means wherein the tamping force calibration means are functional to provide at least one discrete signal detectable by the user when a tamping force of a desired magnitude has been applied.

According to another embodiment of the invention, a handheld espresso tamper is provided for the application of a tamping force by a user, comprising a tamping force calibration means wherein the tamping force calibration means are functional to provide a variable increasing signal detectable by the user corresponding to the application of a variable increasing tamping force magnitude, wherein the variable increasing signal comprises at least one of a visual signal, an electrical signal or an audible signal.

In a further embodiment of the invention, a method of applying a tamping force of a desired magnitude to a quantity of coffee grounds in an espresso portafilter is provided, the method comprising the steps of: applying a progressively increasing tamping force to a handheld espresso tamper comprising a tamping force calibration means functional to provide at least one discrete detectable signal when a tamping force of the desired magnitude is applied; and ceasing the application of the tamping force when the at least one discrete signal is detected.

In yet a further embodiment of the invention, a method of applying a tamping force of a desired magnitude to a quantity of coffee grounds in an espresso portafilter is provided, the method comprising the steps of: applying a progressively increasing tamping force to a handheld espresso tamper comprising a visual tamping force gauge, said gauge comprising an indexed scale of tamping force magnitudes; and ceasing the application of the tamping force when the visual gauge indicates that the desired tamping force has been applied.

Figure 1:
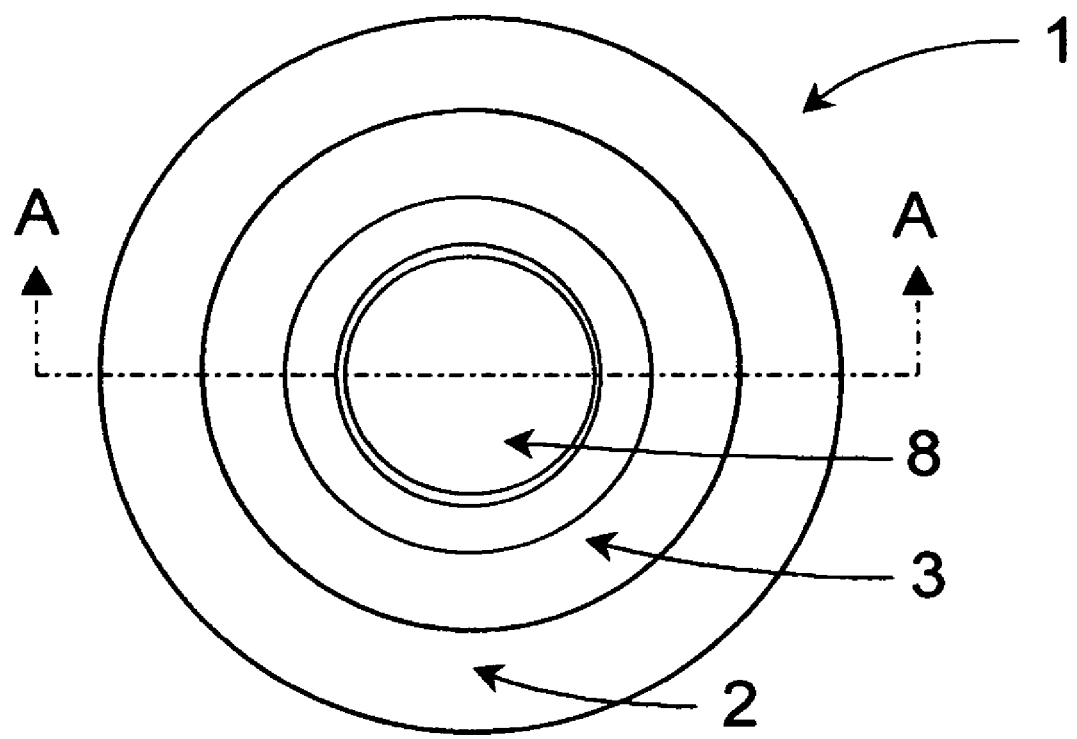
FIGS. 1 and 2 illustrate an external top view and an axial cross-sectional view along section A-A of a handheld espresso tamper according to an embodiment of the present invention, respectively.

A detailed description of the embodiments of the present invention illustrated in the Figures above may be found in the following section.

DETAILED DESCRIPTION OF SEVERAL EMBODIMENTS

In an exemplary illustrative embodiment according to the present invention, a handheld espresso tamper is provided comprising a base for compressing coffee grounds in a coffee filter receptacle, a handle for the manual application of tamping force by a user, and a calibration means for regulating the magnitude of the tamping force exerted on the coffee grounds by the user, said tamping force applied to the coffee grounds through the base. The base is optionally adapted in at least size and shape for use in a particular type of coffee filter receptacle. The base may optionally be constructed of any material suitable for imparting a tamping compressive force to the coffee grounds. Preferably, the base is adapted for use in a standard espresso machine portafilter receptacle, having a round cross-sectional shape, and a diameter of about 49 to 58 mm, and is constructed of metal such as stainless steel or aluminum, or plastic, or a combination thereof. The bottom of the base is preferably shaped in a form suitable for compressing the coffee grounds, such as flat, convex, concave, or a combination of such shapes.

Preferably, the handle is constructed of a material suitable for gripping in the hand of the user, such that the user may exert a tamping force on the coffee grounds with the tamper. Preferable such materials comprise wood, metal such as stainless steel or aluminum, rubber, plastic, or combinations thereof. The handle may optionally be shaped in any form suitable for gripping in the user's hand, with preferable such shapes comprising cylinders, conical frustums, partial spheres or discs. The handle may alternatively be formed in an irregular or aesthetically pleasing shape, or an ergonomic shape in order to approximate the shape of the user's hand. The handle is preferably further shaped so as to avoid direct application of force to the base of the tamper so as to provide for accurate application of a calibrated tamping force while simultaneously reducing potential for pinching of the user's hand between moving parts of the tamper during use. As such, the handle preferably comprises a ridge or flare near the bottom of the handle, such that the user's hand (including fingers) may apply the desired tamping force to the handle without touching or applying any substantial force directly to the base of the tamper, which could decrease the accuracy of the force calibration function of the inventive tamper design. In variations, other obstructions or protrusions such as at least one bump or peg may be used to achieve the same purpose as the flare. The obstructions may be circumferential or not. The handle may optionally be finished in a smooth surface, or may incorporate a surface texture such as knurling or soft or "grippy" polymer material.

Preferably, the calibration means is configured to produce a discrete signal distinctly detectable by the user holding the tamper, upon the exertion of a tamping force of a predetermined magnitude. The signal may be detected through tactile, audible, or visual means, or combinations thereof. The calibration means may optionally be additionally configured such that the desired tamping force magnitude may be easily adjusted by the user to a desired one of a multiplicity of indexed or selectively variable values. Such indexed or selectively variable tamping force magnitudes may correspond to commonly used tamping force magnitudes for the preparation of espresso coffee, which preferably range between 5 to 100 lbs force, and optimally from about 20-40 lbs force. Preferably, the calibration means are substantially enclosed within the handle and/or base enclosures such that there is a reduced risk of injury to the user by pinching fingers and the like during operation of the tamper. Preferably the present inventive espresso tamper is further configured such that the handle and the base are rotationally fixed to each other, such that the rotation of the handle by the user at any time during the application of a tamping force results in the rotation of the base of the tamper, allowing the user to polish the top of the compressed coffee grounds.

Figure 2:
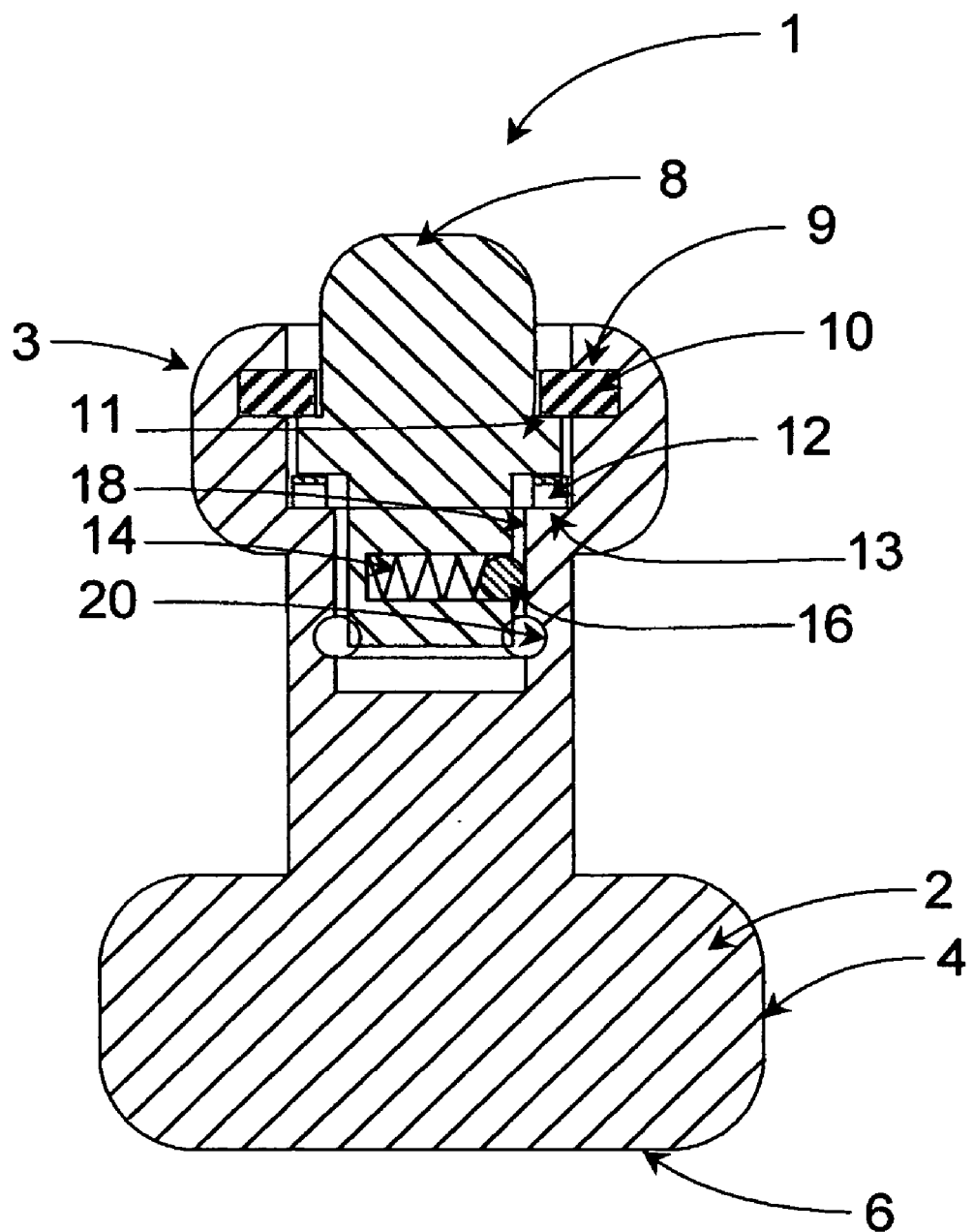

Referring now generally to FIGS. 1 and 2, a handheld espresso tamper 1, comprising main structural components base 2, and plunger 8 is provided in a first disclosed embodiment of the present invention. Tamper base 2, including upper handle portion 3 is functional for compressing the coffee grounds during a tamping procedure prior to the brewing of espresso coffee. Base 2 is preferably configured for compressing coffee grounds in a particular type of filter basket or portafilter, such as a standard espresso machine portafilter receptacle, having a round cross-sectional shape, and a diameter between about 49 to 58 mm. In such case, base 2 may be formed having an axial cross-sectional shape and diameter such that base side surface 4 may fit within the desired filter basket or portafilter, preferably with some functional diametrical clearance such that the side surface 4 may move within the filter basket during use of the tamper without binding against the sides of the filter basket or portafilter. Bottom surface 6 of base 2 is preferably adapted for contact with the surface of the coffee grounds during tamping. Such adaptations of base bottom surface 6 may optionally include a flat surface topography, or a concave or convex topography, or combinations thereof. Espresso tamper base 2 and plunger 8 may be constructed using conventional techniques known in the art from materials suitable for imparting a tamping force to coffee grounds, and transferring a tamping force from the hand of the user, respectively. Preferred such materials include wood, plastic, and metal such as stainless steel or aluminum.

The materials used for constructing the base 2 and plunger 8 may be substantially the same, or different. Further, multiple suitable materials may be used in the individual construction of either the base 2 or plunger 8. In the first disclosed embodiment of the inventive tamper illustrated in FIGS. 1 and 2, multiple components are enclosed within the base 2 and plunger 8, jointly functioning to provide a tamping force calibration means. Snap ring 10 is seated in the groove 9 in base 2 such that the upward travel of plunger 8 is limited by the point where the top of flange 11 in plunger 8 contacts snap ring 10, thereby retaining plunger 8 inside the top of base 2. Wave spring 12 is seated between the bottom of flange 11 and the upper surface of annular ridge 13 in base 2 such that the wave spring 12 is compressed downwards by the downward motion of plunger 8 when the user applies downward tamping force on plunger 8.

The mechanism of plunger 8 includes ball 16 and spring 14. Ball 16 is biased against the inside cylindrical surface 18 of base 2 by the action of spring 14, such that during operation of the tamper when plunger 8 is depressed with a predetermined tamping force, ball 16 is pushed into annular groove 20 in base 2, resulting in an audible and/or tactile signal detectable by the user applying the tamping force to plunger 8 by means of hand pressure. When the user feels or hears the signal caused by ball 16 snapping into groove 20, the application of tamping force may be stopped, having applied exactly the predetermined tamping pressure to the coffee grounds under the bottom surface 6 of base 2. Upon release of tamping pressure on plunger 8, the upward force of compressed wave spring 12 on flange 11 of plunger 8 will disengage ball 16 from groove 20 and displace the plunger 8 upward to its starting position with flange 11 resting against snap ring 10. The magnitude of the predetermined tamping force to be applied with tamper 1 may be selected by varying the spring constant of wave spring 12, and/or by varying the relative distance between the uppermost or starting position of ball 16 and groove 20. Tamper 1 may thereby be used to repeatably apply a precise predetermined tamping force to a quantity of coffee grounds in a filter basket or portafilter, thereby contributing to improved control of the espresso coffee preparation process.

Figure 3:
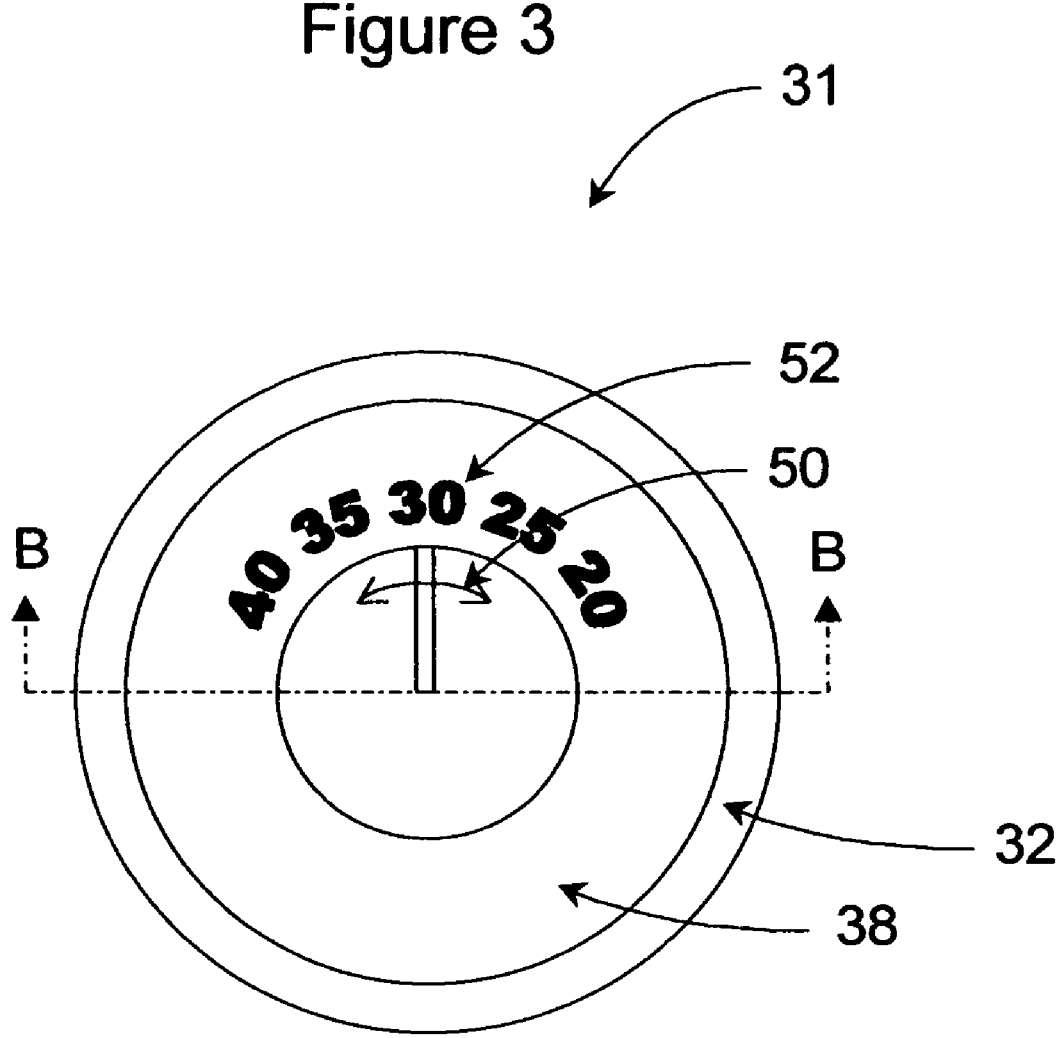
FIGS. 3 and 4 illustrate an external top view and an axial cross-sectional view along section B-B of a handheld espresso tamper according to a further embodiment of the present invention, respectively.
Figure 4:
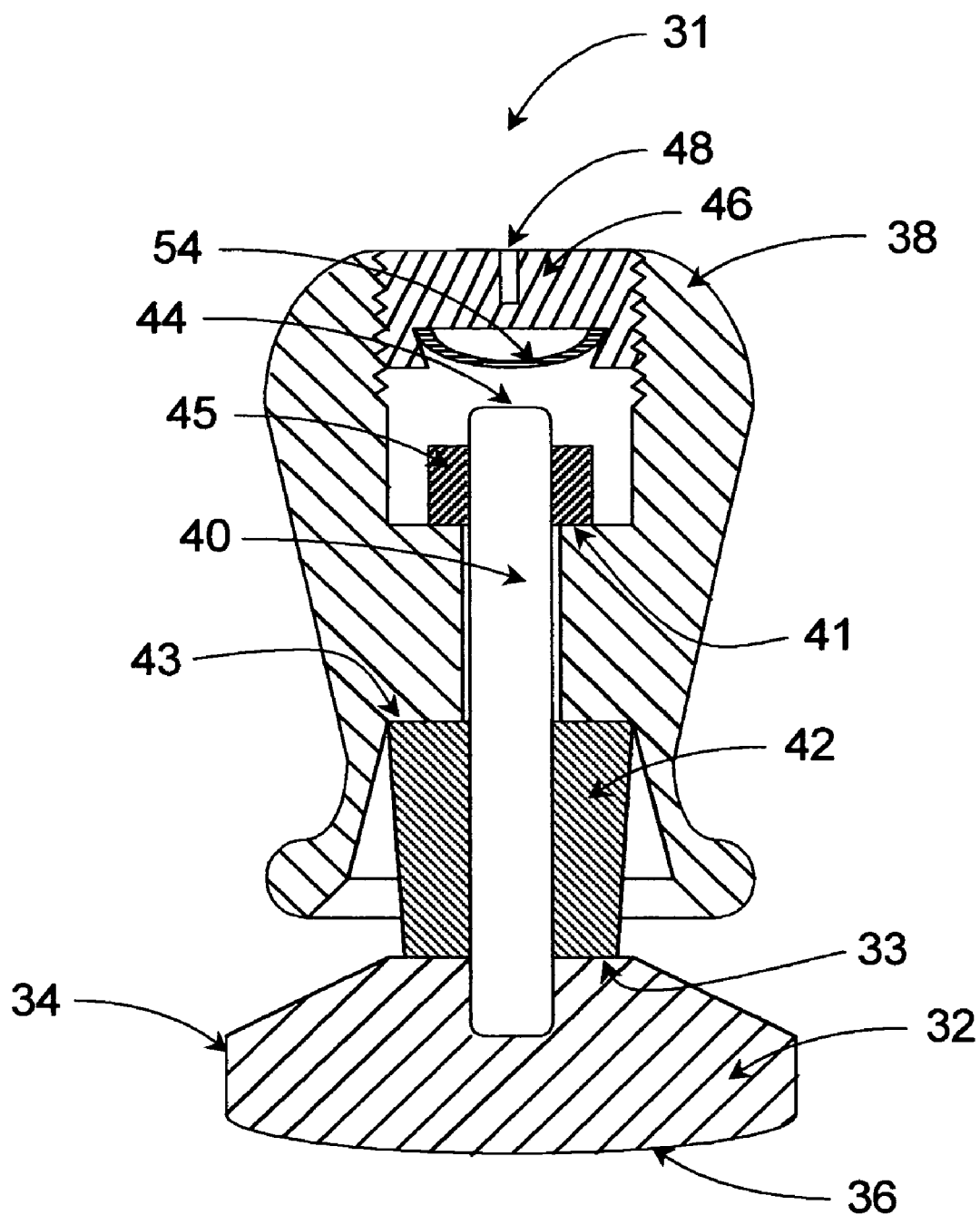

Referring now generally to FIGS. 3 and 4, a handheld espresso tamper 31 is provided in a second disclosed embodiment of the present invention. Tamper 31 is functional to enable the repeatable manual application of a precise predetermined tamping force to a quantity of coffee grounds by a user. Tamper 31 comprises three main structural components: base 32, central rod 40 and handle 38. Rod 40 is fixedly attached to base 32, and handle 38 is retained on rod 40 by means of handle retainer 45 which is attached to rod 40 and stops up against annular ridge 41 of handle 38 when handle 38 is at its uppermost position relative to base 32 and affixed rod 40. Base 32 may be desirably configured for compressing coffee grounds similar to as described above in relation to tamper 1, for example having an axial cross-sectional shape and diameter such that base side surface 34 may fit within the desired filter basket or portafilter device, preferably with some functional diametrical clearance to enable effective tamping of coffee grounds in the device. Similar to the first disclosed embodiment above, base bottom surface 36 may optionally be adapted for contact with coffee grounds during tamping, such as incorporating flat, convex, or concave surface topographies, or combinations thereof.

As in the first disclosed embodiment above, espresso tamper base 32, and handle 38 may be constructed using conventional techniques known in the art from materials suitable for transferring a tamping force from the hand of the user to the coffee grounds, preferably such as wood, plastic, or metal such as stainless steel or aluminum. Rod 40 is preferably constructed from similar materials, and may preferably be cylindrical in form, having a generally circular cross-sectional profile, and incorporating one or more splines for mating sliding engagement with one or more matching slots in the adjoining interior annular wall of handle 38, to enable the rotation of base 32 by turning the handle 38, such as for polishing the surface of the coffee grounds during or following tamping. Alternatively, rod 40 may have a generally square, triangular, hexagonal, or other non-circular geometric cross-sectional shape, such that in mating engagement with a similarly shaped interior bore in handle 38, provides for rotational fixation between handle 38 and base 32. In a further alternative, rod 40 may be replaced by two, three or more similar rods of circular, square, triangular or other cross-sectional shape anchored in spaced arrangement to base 32, and sliding within individual corresponding internal bores in handle 38, such that handle 38 and base 32 are rotationally fixed to each other and allow polishing of the coffee grounds by rotation of the handle 38 by the user.

Spring 42 is seated between the top surface 33 of base 32 and the lower annular ridge 43 of handle 38, and is compressed when tamping force is applied downward on handle 38 acting to transmit said tamping force to the coffee grounds through base 32. Spring 42 may be constructed from any suitable bulk compressible spring material, such suitable materials potentially comprising metal or polymeric compressible materials, foams and rubbers. Alternatively, spring 42 may comprise a coil spring, wave spring washer, Bellville spring washer, finger spring washer, curved spring washer, extension spring, torsion spring, air piston, or solid spring with strain gauge. Optionally, rather than comprising a separate part, the function of spring 42 may be integrated into the construction of the handle and/or base components, such as by forming spring 42 and either the base or the handle from the same material having compressible properties suitable for compression and rebound as required to return the base and handle to a resting position after a tamping force is released by the user.

Signal dome 54 is attached to the underside of dome holder 46 which is preferably attached to the top of handle 38 by threaded or other axially adjustable attachment means. Signal dome 54 is preferably constructed of a suitable resilient material such as metal or plastic, such that its surface may snap between a stable resting position, and a second temporary compressed position resulting in an audible and/or tactile signal to the user holding the handle 38. Dome holder 46 is attached to the top of handle 38 in a position such that the upper surface 44 of rod 4 contacts the surface of signal dome 54, snapping it from a resting to a compressed position, upon application of a predetermined tamping force by the user to the handle 38 and corresponding downward motion of the handle 38 relative to the rod 40 and base 32. Upon the user detecting the signal from the signal dome 54 snapping between positions, the user can release the tamping force, whereby the upward force of compressed spring 42 upon the handle 38 will return the handle to its upper initial position allowing the signal dome 54 to return to its corresponding resting position. The tamper 31 may thereby be used to enable the user to repeatably apply a precise predetermined tamping pressure to the coffee grounds under base 32, similar to as described above in the case of tamper 1. The functionality of the signal dome to produce a discrete signal detectable by the user upon the application of the predetermined tamping force magnitude may be achieved with other devices which may be adapted for use in conjunction with the general design of the present inventive tamper. For example, the dome may be replaced with a simple peg made of a solid material such as a metal and attached to holder 46, such that the peg comes into contact with rod 40 when the predetermined tamping force is applied, producing at least an audible (a "thunk") or tactile (a hard end point to the compressive motion of the spring) discrete signal detectable by the user. Additionally, the predetermined tamping force may be adjusted by axially varying the position of the dome holder 46 and attached signal dome 54 up or down relative to the top of rod 40 such that the dome 54 is triggered by surface 44 upon the application of relatively more or less tamping force, respectively. In the case where axial threading is used to attach dome holder 46 to handle 38, such axial adjustment and resulting adjustment of predetermined tamping force may be achieved by rotating dome holder 46 by means of adjustment slot 48. In such a case, an indexed scale of calibrated tamping force magnitudes 52 may be marked on the upper surface of the handle 38 corresponding to the position of adjustment slot 48 to enable easy adjustment of the predetermined tamping force to be applied with the tamper 31 to a desired calibrated tamping force magnitude.

Figure 5:
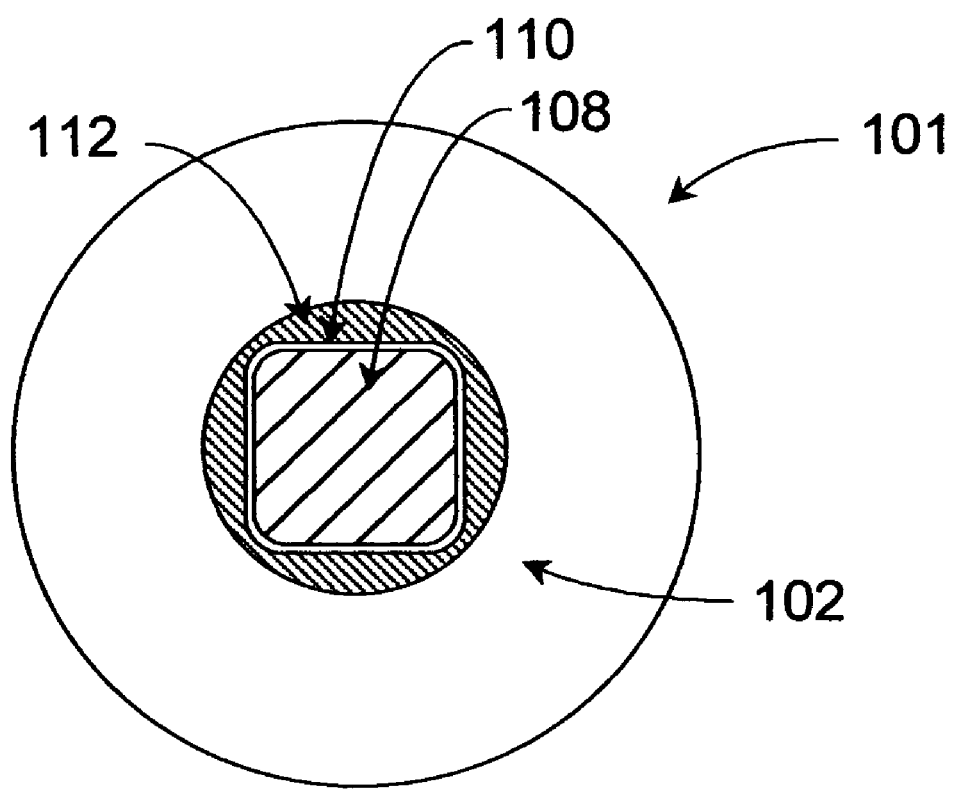
FIGS. 5 and 6 illustrate a cross-sectional plan view and a cross-sectional elevation view along section C-C of a handheld espresso tamper according to yet a further embodiment of the present invention, respectively.
Figure 6:
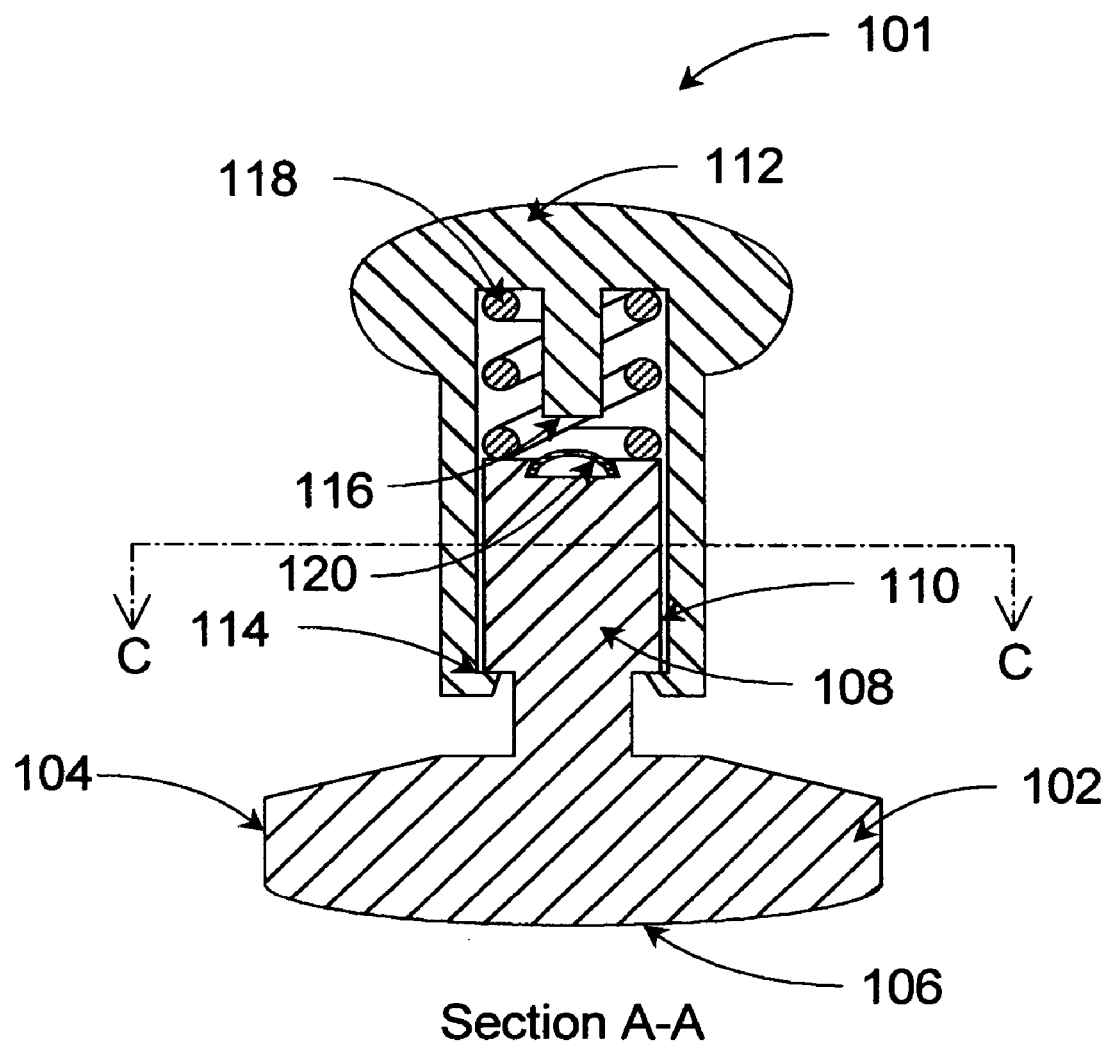

In a third disclosed embodiment of the present invention a handheld espresso tamper 101 is provided as generally illustrated in FIGS. 5 and 6. Similar to the previous two disclosed embodiments above, tamper 101 is functional to enable the repeatable manual application of a precise predetermined tamping force to a quantity of coffee grounds by a user. Tamper 101 comprises three main structural components: base 102, attached piston 108, which slidingly fits within the interior bore inside handle 112. Piston 108 is retained inside the interior bore of handle 112 by retaining ridge 114. These main structural pieces integrate many of the necessary subcomponents required to enable the function of the tamping force calibration means, reducing the number or required pieces to construct the tamper. The reduced number of main structural components (only 3 main components) compared to the first embodiment makes the present, third disclosed embodiment particularly well suited to low cost molded fabrication out of suitable moldable materials such as plastic or some metals. Piston 108 and the interior bore of handle 112 may be generally square in cross-sectional shape to rotationally fix the base 102 to the handle 112 for enabling the user to polish the coffee grounds by turning the handle 112. Base 102 may be desirably configured for compressing coffee grounds similar to as described above in relation to the tamper embodiments described above, i.e. having an axial cross-sectional shape and diameter such that base side surface 104 may fit within the desired filter basket or portafilter device such as a standard espresso portafilter with a diameter between about 49 to 58 mm, preferably with some functional diametrical clearance to enable effective tamping of coffee grounds in the device.

Similar to the above description of first and second disclosed embodiments of the inventive tamper, base bottom surface 106 may be desirably adapted for contact with coffee grounds during tamping, such as incorporating flat, convex, or concave surface topographies, or combinations thereof. Compression spring 118 is located between the top of piston 108 and the top of the internal annular bore inside handle 112, and may comprise any suitable spring means, several examples of which are described in conjunction with the second tamper embodiment detailed above. Signal dome 120 is fixed to the top surface of piston 108 and located a distance beneath signal surface 116 of handle 112 such that when spring 118 is compressed during application of tamping force by the user, handle 112 moves downward relative to piston 108 of base 102 and signal surface 116 contacts signal dome 120, snapping it from a rest position to a compressed position upon the application of the predetermined tamping force magnitude. The signal produced by the signal dome 120 upon snapping from one position to the other is detectable by the user, discretely indicating when the predetermined tamping force has been applied to the tamper. The magnitude of the predetermined tamping force may be varied by changing the spring constant of spring 118 and the resting distance between the signal surface 116 and the signal dome 120.

Optionally any of the above described signal generating means (such as the spring-biased ball in groove, and signal dome devices) may be provided in combination with a suitable spring means as described in the embodiments above as a tamper force calibration kit means suitable for fitting to any desired handle or base design to produce a calibrated tamper according to the present invention. Such handle or base may be provided by a third party for assembly with a tamper force calibration kit means for sale as a complete calibrated tamper by the third party. In addition to use as an espresso tamper, such a calibrated tamper may optionally be used for other non-espresso purposes where the manual application of a calibrated force is required, such as a tamper for the manual assembly of sensitive press-fit parts that require a calibrated seating force. For such additional non-espresso purposes, the handle and/or base components to be integrated with a tamper force calibration kit means may be adapted to suit the application desired such as adapting the shape of the base to fit with sensitive press-fit parts requiring a calibrated seating force in a manual assembly application.

The functionality of the signal generating means exemplified in the above 3 embodiments by the spring-biased ball in groove, and signal dome devices adapted to produce a discrete signal detectable by the user upon the application of the predetermined tamping force magnitude may be achieved with many other signal generating devices or mechanisms which may be adapted for use in conjunction with the general design of the present inventive tamper to suitably produce a signal detectable by at least one of tactile, audible or visual means. Additional exemplary such suitable signal generation means may comprise:

- detent, snapping electrical rocker switch, ballpoint pen Escher/pin or pop button mechanisms suitably adapted as in the examples above to trigger the mechanism upon application of the predetermined tamping force
- a live spring mechanism having limited compressive travel in a further embodiment of the inventive tamper suitable for manufacturing as a single unitary molded piece,
- a bell, music box tine, electric horn or other tone, or pressurized gas release adapted to activate an audible signal upon application of the predetermined tamping force
- motion of a protruding object, flush-mounted object or electric stimulus adapted to activate in contact with the user's hand as a tactile signal upon application of the predetermined tamping force
- electric or other visible light source adapted to activate an electrical and/or visible signal upon application of the predetermined tamping force
- active force readout gauge, which may comprise a linear or circumferential scale, adapted to discretely indicate the application of the predetermined tamping force such as by a line or distinct markings
- a flag or non lighted visual indicator means adapted to activate upon application of the predetermined tamping force.

As will be obvious to one skilled in the art, numerous variations and modifications can be made to the embodiments disclosed above without departing from the spirit of the present invention. Therefore, it should be clearly understood that the form of the present invention described in the embodiments detailed above and shown in the accompanying Figures is illustrative only and is not intended to limit the scope of the present invention.

NUMBERING CHART

1 Tamper
2 Base
3 Upper handle portion
4 Base side surface

6 Bottom surface
8 Plunger
10 Snap ring
11 Flange
12 Wave spring
13 Annular ridge
14 Spring
16 Ball
18 Cylindrical surface
20 Annular groove
31 Tamper
32 Base
33 Top surface
34 Base side surface
38 Handle
40 Rod
41 Annular ridge
42 Handle retainer
42 Spring
44 Upper surface rod
45 Handle retainer
46 Dome holder
48 Slot
52 Force scale
54 Signal dome
101 Tamper variation
102 Base variation
104 Base side surface variation
106 Base bottom surface
108 Piston
112 Inside handle
114 Retaining ridge
118 Compression spring
120 Signal dome box

What is claimed is:

1. A handheld espresso tamper for the precisely repeatable application of a tamping force comprising a handle adapted for holding said tamper in the hand of a user, a base, and mechanical tamping force calibration means wherein said mechanical tamping force calibration means are functional to provide at least one discrete tactile signal detectable by a user holding said handle when a tamping force of a desired magnitude has been applied by said base, wherein said base is rotationally fixed to said handle such that rotation of said handle by said user results in corresponding rotation of said base.

2. The handheld espresso tamper of claim 1 wherein the desired magnitude of the tamping force is adjustable by said user.

3. The handheld espresso tamper of claim 1 wherein said at least one discrete tactile signal additionally comprises at least one of an audible signal, a visual signal, or combination thereof.

4. The handheld espresso tamper of claim 1, wherein said mechanical tamping force calibration means are substantially enclosed within said handle and/or said base.

5. The handheld espresso tamper of claim 4 wherein said desired magnitude of the tamping force is set at the point of manufacture, and is not able to be modified by said user of said tamper without at least partial disassembly of said tamper.

6. The handheld espresso tamper of claim 1, wherein said handle is formed in a shape suitable for accurate manual application of the tamping force to the handle by a user of the tamper and for preventing said user's fingers from resting on the base during operation.

7. The handheld espresso tamper of claim 1, wherein said handle comprises a flare or ridge at a lower portion of said handle.

8. The handheld espresso tamper of claim 1, wherein said handle is formed in a shape suitable for preventing the fingers of said user of said tamper from being pinched between said handle and said base during use.

9. The handheld espresso tamper of claim 1 wherein said mechanical tamping force calibration means further comprises a tactile signal dome means.

10. The handheld espresso tamper of claim 1 wherein said desired magnitude of the tamping force at which the signal is actuated is between 5 and 100 lbs force.

11. The handheld espresso tamper of claim 1 wherein said desired magnitude of said tamping force at which said tactile signal is actuated is between 20 and 40 lbs force.

12. The handheld espresso tamper of claim 2 wherein said desired magnitude of said tamping force is adjustable to a multiplicity of indexed magnitudes ranging between 5 to 100 lbs force.

13. The handheld espresso tamper of claim 2 wherein said desired magnitude of said tamping force is adjustable to a multiplicity of indexed magnitudes ranging between 20 to 40 lbs force.

14. The handheld espresso tamper of claim 1, wherein said base is adapted to fit within a desired espresso portafilter such that said tamping force may be applied directly to a quantity of coffee grounds within said portafilter.

15. A tamper comprising a base with a substantially flat bottom and an upper portion extending substantially vertically from said base and comprising a handle adapted for holding said tamper in the hand of a user, said tamper further comprising a mechanical tamping force calibration device disposed within said upper portion, wherein the mechanical tamping force calibration device comprises a mechanical tactile tamping force indicator, wherein said mechanical tamping force calibration device is operable such that upon activation, a discrete tactile signal corresponding to the application of a desired precisely repeatable tamping force magnitude is generated by the mechanical tactile tamping force indicator and is detectable by a user holding said handle, and wherein said base is rotationally fixed to said handle such that rotation of said handle by said user results in corresponding rotation of said base.

16. The tamper of claim 15 wherein said tamper is a handheld espresso tamper.

17. The tamper of claim 15 wherein said upper portion is rotationally fixed in relation to said base.

18. The tamper of claim 15 wherein said upper portion comprises a flange adapted to abut the fingers of a user.

19. The tamper of claim 15 wherein said upper portion comprises said handle disposed about a moveable plunger, said plunger depressible by a user upon application of a desired tamping force, wherein when said desired tamping force is applied, said mechanical tamping force calibration device, comprising a signal dome, snaps from a first position to a second position generating at least one of a tactile signal and an audible signal detectable by said user.

20. The tamper of claim 19 wherein said handle comprises an obstruction adapted to inhibit a user's hand from sliding down said handle.

21. A tamper force calibration kit comprising a mechanical tamper force calibration means which comprises a tactile signal generating means, said tamper force calibration kit adapted to be integrated into a handheld tamper for the precisely repeatable application of a tamping force directly to a tamped material, said handheld tamper comprising a base and a handle adapted for holding said handheld tamper in the hand of a user, wherein said mechanical tamping force calibration means are functional to provide at least one discrete tactile signal detectable by a user of said handheld tamper holding said tamper when a tamping force of a desired magnitude has been applied, wherein said base is rotationally fixed to said handle such that rotation of said handle by said user results in corresponding rotation of said base.

* * * * *